US011829989B2

(12) United States Patent
Pareek et al.

(10) Patent No.: US 11,829,989 B2
(45) Date of Patent: Nov. 28, 2023

(54) SYSTEM AND METHOD FOR AUTHENTICATING A LOCATION OF A PAYMENT ACCEPTANCE DEVICE

(71) Applicant: MASTERCARD INTERNATIONAL INCORPORATED, Purchase, NY (US)

(72) Inventors: Ravi Pareek, Pune (IN); Dattesh Naik, Pune (IN); Shrikant Subhash Belan, Pune (IN); Deepti Dhapola, Pune (IN); Piyush Sharma, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 632 days.

(21) Appl. No.: 15/947,096

(22) Filed: Apr. 6, 2018

(65) Prior Publication Data

US 2018/0293570 A1 Oct. 11, 2018

(30) Foreign Application Priority Data

Apr. 11, 2017 (SG) ............................ 10201702985X

(51) Int. Cl.
*G06Q 20/32* (2012.01)
*G06Q 20/08* (2012.01)
*G06Q 20/20* (2012.01)
*G06Q 20/10* (2012.01)
*G06Q 20/40* (2012.01)

(52) U.S. Cl.
CPC ..... *G06Q 20/3224* (2013.01); *G06Q 20/0855* (2013.01); *G06Q 20/102* (2013.01); *G06Q 20/20* (2013.01); *G06Q 20/3278* (2013.01); *G06Q 20/4015* (2020.05)

(58) Field of Classification Search
CPC ........... G06Q 20/3224; G06Q 20/0855; G06Q 20/102; G06Q 20/20; G06Q 20/3278; G06Q 20/401
USPC .......................................................... 705/67
See application file for complete search history.

(56) References Cited

U.S. PATENT DOCUMENTS

| | | | | |
|---|---|---|---|---|
| 6,836,765 B1* | 12/2004 | Sussman | ................ | G06Q 20/02 709/203 |
| 2010/0049615 A1* | 2/2010 | Rose | .................... | G06Q 20/202 705/17 |
| 2011/0061014 A1* | 3/2011 | Frader-Thompson | ...................... | G01D 4/002 715/771 |
| 2012/0179538 A1* | 7/2012 | Hines | ................. | G06Q 30/0242 705/14.51 |

(Continued)

*Primary Examiner* — Patrick McAtee
*Assistant Examiner* — Zesheng Xiao
(74) *Attorney, Agent, or Firm* — Pramudji Law Group PLLC; Ari Pramudji

(57) ABSTRACT

A system and method for authenticating a location of a payment acceptance device is provided. The method comprises receiving a transaction request comprising merchant data, the merchant data identifying the payment acceptance device and location information identifying a location at which the transaction request is initiated; retrieving, from a database, a payment acceptance device identifier based on the merchant data, the payment acceptance device identifier identifying a location at which the payment acceptance device is registered; authenticating the location of the payment acceptance device by comparing the location information and the location identified by the payment acceptance device identifier.

20 Claims, 3 Drawing Sheets

(56) References Cited

U.S. PATENT DOCUMENTS

| | | | | |
|---|---|---|---|---|
| 2012/0190341 A1* | 7/2012 | Gupta | ............ | H04L 63/0853 |
| | | | | 455/411 |
| 2014/0207682 A1* | 7/2014 | Wolfond | ............ | G06Q 20/3276 |
| | | | | 705/44 |
| 2015/0134438 A1* | 5/2015 | Chavarria | ......... | G06Q 30/0226 |
| | | | | 705/14.27 |
| 2015/0149353 A1* | 5/2015 | Linden | ............ | G06Q 20/28 |
| | | | | 705/41 |
| 2015/0302409 A1* | 10/2015 | Malek | ............ | G06Q 20/385 |
| | | | | 705/44 |
| 2016/0063493 A1* | 3/2016 | Howe | ............ | G06Q 20/322 |
| | | | | 705/44 |
| 2016/0132851 A1* | 5/2016 | Desai | ............ | H04W 12/06 |
| | | | | 705/21 |

* cited by examiner

SYSTEM AND METHOD FOR AUTHENTICATING A LOCATION OF A PAYMENT ACCEPTANCE DEVICE

CROSS-REFERENCE TO RELATED APPLICATION

This application claims the benefit of and priority to Singapore Patent Application No. 10201702985X filed Apr. 11, 2017. The entire disclosure of the above application is incorporated herein by reference.

FIELD

The present disclosure relates to systems and methods for authenticating a location of a payment acceptance device.

BACKGROUND

This section provides background information related to the present disclosure which is not necessarily prior art.

Point-of-sale terminals (POS) are used by merchants in stores during payment of goods and/or services (or "products") by a consumer using their payment cards or other payment devices, such as payment-enabled smartphones or wearable devices. Recently, wireless POS terminals are used when merchants do not have sufficient space for a checkout counter. For example, in a restaurant with only outdoor seating available, there is no space for a counter and the merchant has to bring the wireless POS terminal to the consumer for payment. Further, wireless POS terminals can also save consumers the trouble of going to a checkout counter to pay for the products and services by bringing the point of payment to the consumer.

However, wireless POS terminals can only be used at the merchant's location at which it was initially registered. Acquirers or financial institutions that facilitate such payment, need to know the location of the POS terminals to prevent unauthorized transactions involving fraud or theft. That is, the acquirers need to know if the wireless POS that is used for payment is located at its rightful location (e.g., location at which it should be). For example, a merchant may have his POS terminal stolen and the stolen terminal maybe used to transact goods and/or services that are not sold by the merchant to which the terminal is registered. The unauthorized transaction is approved as there are no measures to track the location of such stolen POS terminal.

In addition, management of wireless POS terminals may be a problem for merchants if several wireless POS terminals are installed in their premises. The POS terminals in the merchant's store may have different serial numbers and the merchant wishes to keep track of the activity and location associated with each POS terminal during a transaction.

A need therefore exists to provide a method and system for authenticating a location of a payment acceptance device that seeks to address at least some of the above problems.

SUMMARY

This section provides a general summary of the disclosure, and is not a comprehensive disclosure of its full scope or all of its features. Aspects and embodiments of the disclosure are set out in the accompanying claims.

According to a first aspect of the present disclosure, there is provided a method for authenticating a location of a payment acceptance device relating to a merchant, comprising: receiving a transaction request comprising merchant data, the merchant data identifying the payment acceptance device and location information identifying a location at which the transaction request is initiated; retrieving, from a database, a payment acceptance device identifier based on the merchant data, the payment acceptance device identifier identifying a location at which the payment acceptance device is registered; authenticating the location of the payment acceptance device by comparing the location information and the location identified by the payment acceptance device identifier.

In an embodiment, the transaction may be conducted if the location information matches the location identified by the payment acceptance device identifier.

In an embodiment, authenticating the location of the payment acceptance device by comparing the location information and the location identified by the payment acceptance device identifier may comprise: sending a result of the comparison to a user device; and receiving, from the user device, an approval to conduct the transaction in response to the result, wherein the transaction is conducted in response to receiving the approval.

In an embodiment, authenticating the location of the payment acceptance device by comparing the location information and the location identified by the payment acceptance device identifier may further comprise: receiving information relating to the merchant; wherein the approval to conduct the transaction is received in response to the information relating to the merchant.

In an embodiment, authenticating the location of the payment acceptance device by comparing the location information and the location identified by the payment acceptance device identifier may comprise: sending, to a third party server, a result of the comparison; and receiving, from the third party server, an approval to conduct the transaction in response to the result, wherein the transaction is conducted in response to receiving the approval.

In an embodiment, the method may further comprise determining the payment acceptance device identifier at a time of installing the payment acceptance device based on a category of the merchant, wherein the category comprises an industry-type of the merchant.

In an embodiment, the payment acceptance device identifier may comprise information to identify a type of network on which the payment acceptance device operates on, wherein the type of network is one of: a communication network, a code division multiple access (CDMA) network or a global system for mobile communication (GSM) network.

In an embodiment, the method may comprise updating the database when the payment acceptance device identifier is determined; forwarding, to a server, a plurality of payment acceptance device identifiers stored in the database.

In an embodiment, the payment acceptance device may comprise a point-of-sale terminal.

According to a second aspect of the present disclosure, there is provided a system for authenticating a location of a payment acceptance device relating to a merchant, comprising a facilitator module, the facilitator module comprising: at least one processor; and at least one memory including computer program code; the at least one memory and the computer program code configured to, with at least one processor, cause the facilitator module at least to: receive a transaction request comprising merchant data, the merchant data identifying the payment acceptance device and location information identifying a location at which the transaction request is initiated; retrieve, from a database, a payment acceptance device identifier based on the merchant data, the payment acceptance device identifier identifying a location at which the payment acceptance device is registered; and authenticate the location of the payment acceptance device by comparing the location information and the location identified by the payment acceptance device identifier.

In embodiments, the facilitator module may be further caused to: send a result of the comparison to the user device; receive, from the user device, an approval to conduct the transaction in response to the result, wherein the transaction is conducted in response to receiving the approval; receive information relating to the merchant, wherein the approval to conduct the transaction is received in response to the information relating to the merchant; send, to a third party server, a result of the comparison; receive, from the third party server, an approval to conduct the transaction in response to the result, wherein the transaction is conducted in response to receiving the approval; determine the payment acceptance device identifier at a time of installing the payment acceptance device based on a category of the merchant, wherein the category comprises an industry-type of the merchant; update the database when the payment acceptance device identifier is determined; and forward, to a server, a plurality of payment acceptance device identifiers stored in the database.

In an embodiment, there is provided a non-transient computer-readable storage medium having stored thereon computer program instructions which, when executed by at least one processor, cause the at least one processor to perform a method according to the first aspect.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments will be better understood and readily apparent to one of ordinary skill in the art from the following written description, by way of example only, and in conjunction with the drawings, in which.

Corresponding reference numerals indicate corresponding parts throughout the several views of the drawings.

DETAILED DESCRIPTION

Figure 1:
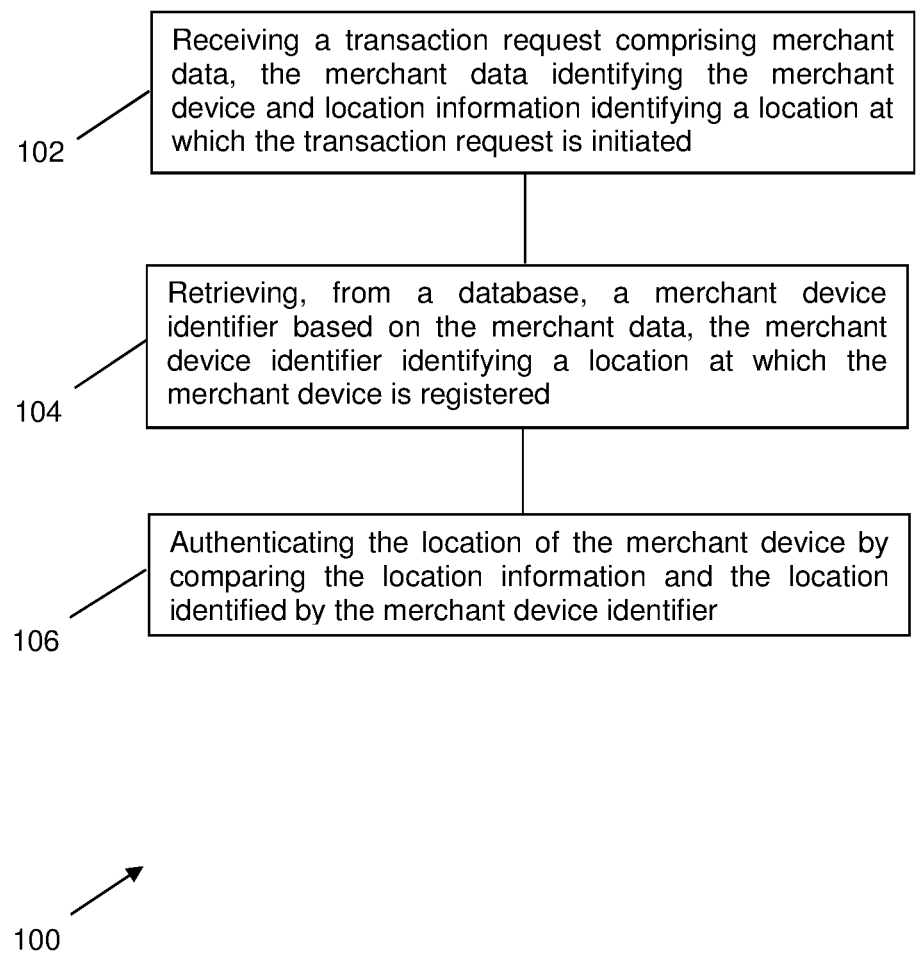
FIG. 1 shows a flow chart illustrating a method for authenticating a location of a payment acceptance device according to an example embodiment.

Embodiments of the present disclosure will be described, by way of example only, with reference to the drawings. The description and specific examples included herein are intended for purposes of illustration only and are not intended to limit the scope of the present disclosure.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "identifying", "authorizing", "verifying" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer, or other device, selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium, such as exemplified in the Internet system, or wireless medium, such as exemplified in the GSM mobile telephone system. The computer program when loaded and executed on such a computer effectively results in an apparatus that implements the steps of the preferred method.

FIG. 1 shows a flow chart 100 illustrating a method for authenticating a location of a payment acceptance device according to an example embodiment. At step 102, a transaction request is received comprising merchant data, the merchant data identifying the payment acceptance device and location information identifying a location at which the transaction request is initiated. At step 104, a payment acceptance device identifier is retrieved from a database based on the merchant data, the payment acceptance device identifier identifying a location at which the payment acceptance device is registered. At step 106, the location of the payment acceptance device is authenticated by comparing the location information and the location identified by the payment acceptance device identifier.

In the following description, the transaction request is initiated using an account. In an example, the account is a payment card which is a card that can be used by an account holder for a transaction with a merchant. In the following description, the term "payment cards" refer to any suitable transaction cards, such as credit cards, debit cards, prepaid cards, charge cards, membership cards, promotional cards, frequent flyer cards, identification cards, gift cards, and/or any other device that may hold payment account information, such as mobile phones, smartphones, personal digital assistants (PDAs), key fobs, and/or computers. Each type of payment card can be used as a method of payment for performing a transaction.

Additionally or alternatively, a digital wallet may also be an account that can be used by a digital wallet user for a transaction with a merchant. The digital wallet is usually linked to a digital wallet user's bank account or a digital wallet user's payment card. Typically, the payments by digital wallets are facilitated by a different entity, such as Google®, Apple® or Paypal®. Additionally or alternatively, the payments by digital wallets are facilitated by an entity who also managed the payment cards, such as Mastercard®.

In the following description, an account holder may refer to either a payment card holder or a digital wallet holder. In some instances, a user (or a consumer) who uses the account to transact with the merchant is also the account holder. The user may initiate the transaction with the merchant to buy goods and/or services from the merchant using his payment card. In another example, the customer may initiate the transaction with one merchant to buy goods and/or services from another merchant using his digital wallet.

In specific embodiments, the payment card user may also be a digital wallet user. For example, the user uses a payment card that has been registered to a digital wallet account which qualifies the payment card user as a digital wallet user. In an embodiment, the transaction is a payment transaction. In other words, completion of the transaction involves a payment between parties to the transaction. Completion of the transaction may also be known as settling a transaction.

Figure 2:
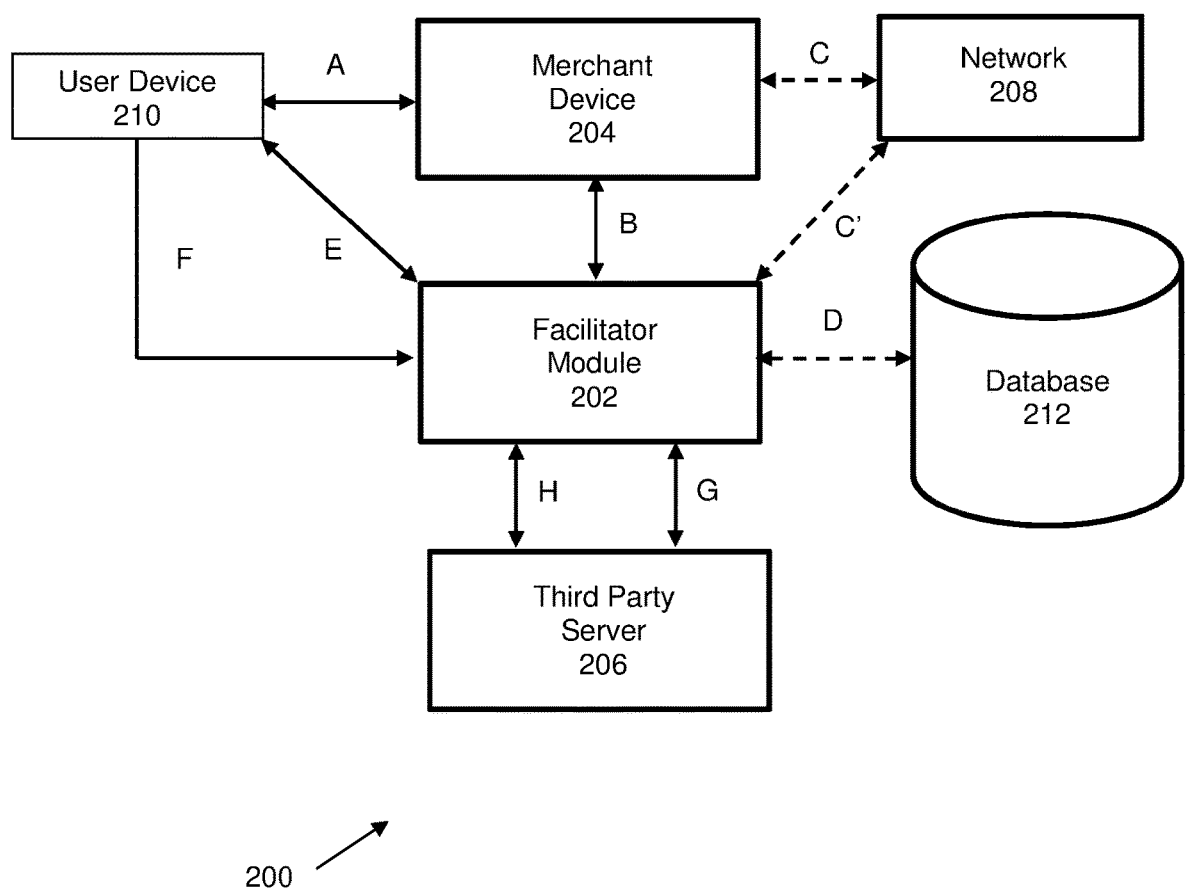
FIG. 2 shows a schematic diagram illustrating the flow of information in a system for authenticating a location of a payment acceptance device, according to an example embodiment.

FIG. 2 shows a schematic diagram illustrating the flow of information in a system 200 for conducting a transaction, according to an example embodiment. The system 200 comprises a facilitator module 202, a payment acceptance device 204, a third party server 206, a database 212 and a user device 210. The facilitator module 202 is in communication with the payment acceptance device 204, the third party server 206, the database 212 and the user device 210. The facilitator module 202 may comprise at least one processor and at least one memory including computer program code. The at least one memory and the computer program code is configured to, with at least one processor, cause the facilitator module 202 at least to: receive a transaction request comprising merchant data, the merchant data identifying the payment acceptance device and location information identifying a location at which the transaction request is initiated; retrieve, from a database, a payment acceptance device identifier based on the merchant data, the payment acceptance device identifier identifying a location at which the payment acceptance device is registered; and authenticate the location of the payment acceptance device by comparing the location information and the location identified by the payment acceptance device identifier.

At step A in FIG. 2, the payment acceptance device 204 receives a payment request from the user device 210. The payment request may originate from a consumer who wishes to purchase one or more products online from a merchant's store.

The user device 210 typically is associated with a customer (or user) who is a party to a transaction that occurs between the user device 210 and the payment acceptance device 204 through a transaction. The user device 210 may be a fixed (wired) computing device or a wireless (portable) computing device. In specific implementations, the user device 210 may be a handheld or portable or mobile device carried or used by the customer, or may refer to other types of electronic devices, such as a personal computer, a land-line telephone or an interactive voice response (IVR) system, and the like. The mobile device may be a device, such as a mobile phone, a laptop computer, a personal digital computer (PDA), a mobile computer, a portable music player (such as an iPod™, and the like).

The payment acceptance device 204 typically is associated with the merchant who is also a party to the transaction that occurs between user device 210 and the payment acceptance device 204 through the transaction. The payment acceptance device 204 may be a point-of-sale (POS) terminal, a personal computer, a computer server (hosting a website, for example), an IVR system, a land-line telephone, or any type of mobile device, such as a mobile phone, a personal digital assistant (PDA), a laptop computer, a tablet computer, and the like. It is to be understood that a POS terminal includes a wireless POS terminal that is managed and located at the merchant's store.

Where the context permits, singular (e.g., "product") or plural terms may also include the plural (e.g., "products") or singular term, respectively. In an example, during a transaction, a transaction request message is generated at the user device 210 in response to the customer making a selection of a good and/or service (or "product") to be purchased from the merchant. In other words, the transaction request message relates to a transaction between the consumer and the merchant. The transaction may be performed via a website of the merchant. For example, the consumer may browse through the merchant's store and wish to buy a particular product from the merchant. The consumer selects the product he wishes to purchase and proceeds to make payment for the product (or "initiating a transaction") at the payment counter. He may make payment for the product at the POS terminal by contactless means, such as using a digital wallet account.

It can be appreciated that various forms of contactless payment can be realized, for e.g., such as Near Field Communication (NFC), Bluetooth or Wi-Fi. The payment request may further comprise product data to identify each of the products that the consumer wishes to purchase. The product data may include a product description, a product price and a merchant associated with the product. The payment request may further include the consumer's account data so that the issuer may be able to identify which account is used for payment of the products.

At step B, the facilitator module 202 receives a transaction request from the payment acceptance device 204. The transaction request may comprise merchant data identifying the payment acceptance device 204 and location information identifying a location at which the transaction request is initiated. The transaction request may also comprise the payment request that is transmitted from the user device 210 to the payment acceptance device 204 as described in step A.

The location of the merchant, identifying a geographical location of the merchant, may be stored in a database. In this context, geographical location data of the merchant may include latitude and longitude coordinates and a postal address. The latitude and longitude coordinates may be in any suitable format, such as: (i) Degrees, minutes, and seconds (DMS), (ii) Degrees and decimal minutes (DMM), and (iii) Decimal degrees (DD).

For example, the payment acceptance device 204 may be a wireless POS terminal with serial number 1234 of merchant ABC that is located at 567, Street XYZ. As the consumer makes payment at the merchant's store for a particular product, the transaction request received by the facilitator module 202 may therefore contain data of the merchant ABC, the wireless POS terminal 1234 and that a consumer is making payment of a product at 567, Street XYZ. The location information may be obtained through a communication network that is used by the wireless POS terminal 1234, such as a code division multiple access (CDMA) network or a global system for mobile communication (GSM) network, as shown in step C of FIG. 1. The transaction request may also contain other information, such as the product description, the product price and the consumer's account details. In other embodiments, the facilitator module 202 may also acquire the location of the payment acceptance device 204 directly through the network 208, as shown in step C' of FIG. 1.

At step D, the facilitator module 202 retrieves from the database 212, a payment acceptance device identifier identifying a location at which the payment acceptance device 204 is registered based on the received merchant data. The merchant identifier may be determined at a time of installing the payment acceptance device 204 based on a category of the merchant, which may include an industry-type of the merchant. The payment acceptance device identifier may include information to identify a type of network on which the payment acceptance device operates on, the type of network is one of: the communication network, the code division multiple access (CDMA) network or the global system for mobile communication (GSM) network (as shown in step C of FIG. 1). For example, merchant ABC wishes to install a wireless POS terminal 1234 at his stationery store at 567, Street XYZ. ABC requests an acquirer to do so and after installation, information pertaining to the wireless POS terminal 1234 which is installed in the stationery store at 567, Street XYZ is stored in a database administered by the acquirer. The wireless POS terminal 1234 may use a particular GSM network for wireless transactions and the location of terminal 1234 is then stored in the database. The acquirer may also forward the information to the facilitator module 202 to be updated in its database 212. If there are multiple wireless POS terminals installed at the merchant's store, a plurality of payment acceptance device identifiers may be present. The facilitator module 202 may store the plurality of merchant identifiers in the database 212 and forward the plurality of merchant identifiers to another server.

After retrieving the necessary information from database 212, the facilitator module 202 may authenticate the location of the payment acceptance device by comparing the location information and the location identified by the payment acceptance device identifier. The transaction is conducted if the location information matches the location identified by the payment acceptance device identifier. For example, during payment of the product at the checkout counter of stationery store, location of the wireless POS terminal 1234 is determined via the GSM network to be 567, Street XYZ. This information is sent to the facilitator module 202 together with the merchant's shop details, i.e., merchant ABC stationery store at 567, Street XYZ. The facilitator module 202 subsequently retrieves information relating to the merchant ABC from database 212 and compares the location information received to the payment acceptance device identifier stored in the database 212. Since both are identical, "567, Street XYZ", the facilitator module 202 proceeds to authenticate the location of the wireless POS terminal 1234.

Upon receiving the location information at step B, the facilitator module 202 is further configured to compare the location information with the location identified by the payment acceptance device identifier. In other words, the facilitator module 202 may determine that the location of the payment acceptance device is authenticated if the location of the payment acceptance device matches or corresponds to the location identified by payment acceptance device identifier. For example, the location of the payment acceptance device is compared to the complete preset or registered location that is identified by the payment acceptance device identifier. On the other hand, the facilitator module may compare a selected portion of the location information. For example, the first few numbers of the location information is compared by the facilitator module to the appropriate portions of the preset or registered location information.

At step E, after authentication, the facilitator module 202 sends a result of the comparison to the user device 210. The consumer may receive such a result in his mobile smartphone application, showing that the location he has made the transaction corresponds to the registered location of the wireless POS terminal. The consumer approves the transaction using the application after receiving the result of the comparison and at step F, an approval to conduct the transaction in response to the result is received from the user device 210 by the facilitator module 202, wherein the transaction is conducted in response to receiving the approval.

Alternatively, the facilitator module 202 may also send the result and the related merchant information to the user device 210. The consumer may then approve the transaction based on the merchant information and the result of the comparison. For example, the facilitator module 202 sends the comparison result that the location of wireless POS terminal 1234 is identical as well as the transaction was carried out at stationery store located at 567, Street XYZ. The consumer approves the transaction using his mobile smartphone and the facilitator module 202 receives the approval.

The facilitator module 202 may send the result to a verification device which may or may not be the user device 210. Alternatively, the verification device may be a device operated by the merchant to receive the result of the comparison. In this way, the merchant is informed of the result whether the comparison is successful or unsuccessful. In an embodiment, the result may or may not be in the same format as the transaction request message. That is, the result may be an in-band or out-of-band message. An out-of-band message refers to a message that is sent via a communication path, type or protocol which is different to the current communication path, type or protocol. Therefore, if message flow thus far has been via the Transmission Control Protocol/Internet Protocol (TCP/IP), the result may be sent via SMS so as to be an out-of-band message. In other words, an out-of-band message typically makes use of two separate networks which work simultaneously to authenticate a user. For example, a fraudulent user may initiate a transaction via a first network and the account holder will be informed of such a transaction via a second network. This provides an opportunity to the holder of the account to stop the transaction. Advantageously, an out-of-band message may be used to authenticate a customer even if a fraudulent user gains access to an account.

It is to be understood that the verification device may also be a fixed (wired) computing device or a wireless (portable) computing device. In specific implementations, the verification device may be a handheld or portable or mobile device carried or used by the customer, or may refer to other types of electronic devices, such as a personal computer, a land-line telephone or an interactive voice response (IVR) system, and the like. The mobile device may be a device, such as a mobile phone, a laptop computer, a personal digital computer (PDA), a mobile computer, a portable music player (such as an iPod™, and the like). The verification device operated by a merchant may be a point-of-sale (POS) terminal, a personal computer, a computer server (hosting a website, for example), an IVR system, a land-line telephone, or any type of mobile device, such as a mobile phone, a personal digital assistant (PDA), a laptop computer, a tablet computer, and the like.

At step G, facilitator module 202 sends the result of the comparison to the third party server 206 and at step H, the third party server 206 approves the transaction in response to the result, wherein the transaction is conducted in response to receiving the approval from the third party server 206. The third party server 206 may be an issuer associated with the consumer to facilitate payment of the transaction request. Continuing from the above example, the consumer wishes to use his virtual wallet by issuer DEF to pay for his purchases. During checkout and authentication by the facilitator module 202, the result of the comparison is sent to issuer DEF server. Other details such as the product description, the product price and the consumer's account details may also be sent to issuer DEF. Subsequently, issuer DEF approves the transaction and proceeds to deduct funds from the consumer's account.

On the other hand, if the wireless POS terminal 1234 is stolen and used at a different location, the facilitator module 202 identifies that the location is different from the registered location and declines the transaction. In addition, if the third party server 206 determines that there are insufficient funds in the consumer's account, it declines the transaction and transmits a notification to the facilitator module 202 for cancellation of the transaction. Also, the consumer may also decline the transaction by cancelling the request in the user device 210 if he discovers that the location of the payment acceptance device 204 or the details of the merchant are inaccurate. As such, there are multiple checkpoints to check and cancel the transaction in the event of fraud or theft.

Use of the term "module" herein may be understood to mean a single computing device or a plurality of interconnected computing devices which operate together to perform a particular function. That is, the module may be contained within a single hardware unit or be distributed among several different hardware units. More particular, in the hardware sense, a module is a functional hardware unit designed for use with other components or modules. For example, a module may be implemented using discrete electronic components, or it can form a portion of an entire electronic circuit, such as an Application Specific Integrated Circuit (ASIC). Numerous other possibilities exist. Those skilled in the art will appreciate that the system can also be implemented as a combination of hardware and software modules.

An exemplary computing device which may be operated as a module is described below with reference to FIG. 3.

Figure 3:
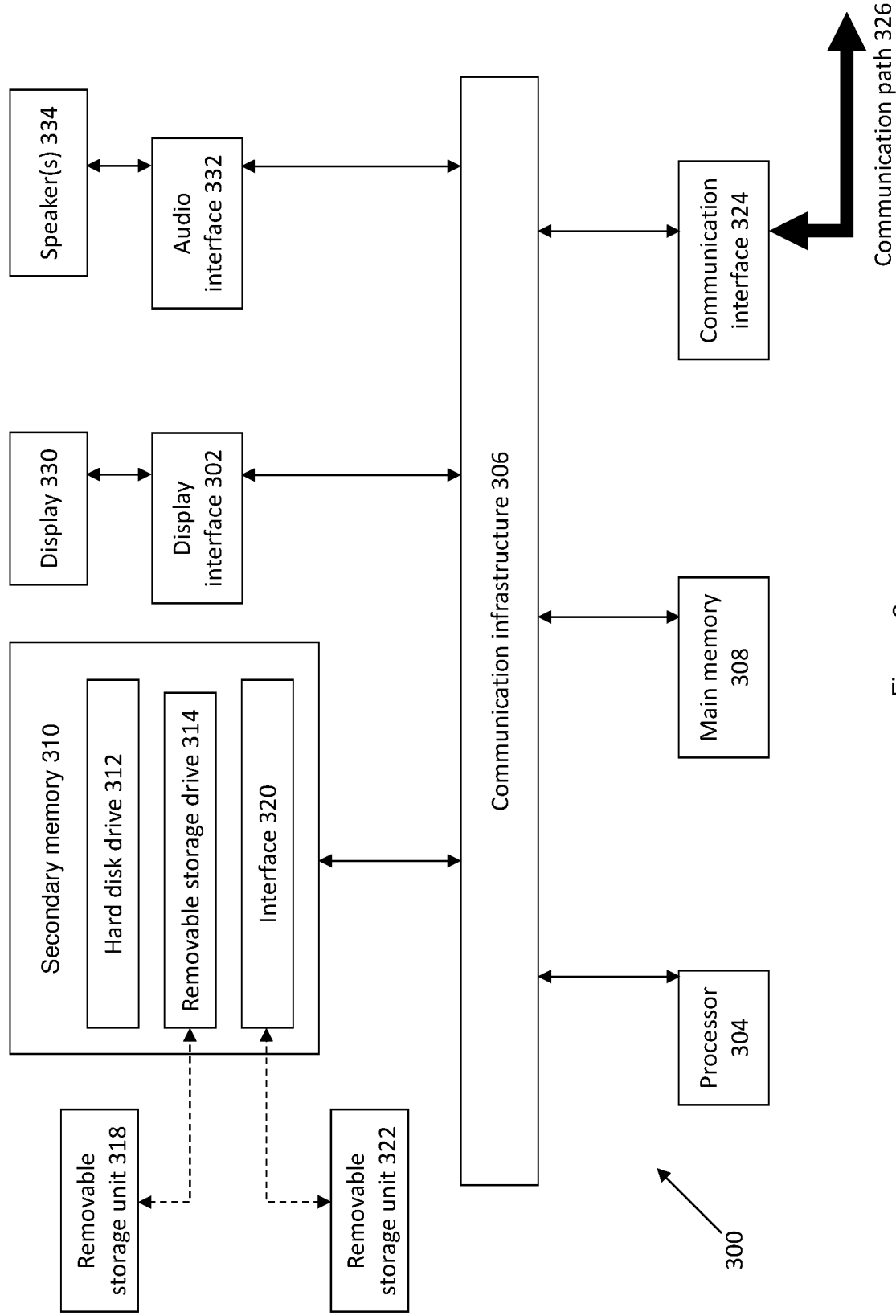
FIG. 3 shows a schematic diagram of a computer device/system suitable for realizing a facilitator module, according to an example embodiment.

FIG. 3 shows a schematic diagram of a computer device or computer system 300 suitable for realizing the facilitator module 202 or the third party server 206. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a hard disk drive 312, which may be a hard disk drive, a solid state drive or a hybrid drive and/or a removable storage drive 314, which may include a magnetic tape drive, an optical disk drive, a solid state storage drive (such as a USB flash drive, a flash memory device, a solid state drive or a memory card), or the like. The removable storage drive 314 reads from and/or writes to a removable storage unit 318 in a well-known manner. The removable storage unit 318 may include magnetic tape, optical disk, non-volatile memory storage medium, or the like, which is read by and written to by removable storage drive 314. As will be appreciated by persons skilled in the relevant art(s), the removable storage unit 318 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 320. Examples of a removable storage unit 322 and interface 320 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 322 and interfaces 320 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments, the communication interface 324 permits data to be transferred between the computing device 300 and a data communication network, such as a public data or private data communication network. The communication interface 324 may be used to exchange data between different computing devices 300 which such computing devices 300 form part of an interconnected computer network. Examples of a communication interface 324 can include a modem, a network interface (such as an Ethernet card), a communication port (such as a serial, parallel, printer, GPIB, IEEE 1394, RJ45, USB), an antenna with associated circuitry, and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface 324 via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage unit 318, removable storage unit 322, a hard disk installed in hard disk drive 312, or a carrier wave carrying software over communication path 326 (wireless link or cable) to communication interface 324. Computer readable storage media refers to any non-transitory tangible storage medium that provides recorded instructions and/or data to the computing device 300 for execution and/or processing. Examples of such storage media include magnetic tape, CD-ROM, DVD, Blu-Ray™ Disc, a hard disk drive, a ROM or integrated circuit, a solid state drive (such as a USB flash drive, a flash memory device, a solid state drive or a memory card), a hybrid drive, a magneto-optical disk, or a computer readable card, such as a PCMCIA card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites, and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the hard disk drive 312, or the interface 320. Alternatively, the computer program product may be downloaded to the computer system 300 over the communications path 326. The software, when executed by the processor 304, causes the computing device 300 to perform functions of embodiments described herein.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

The method for authenticating a location of a payment acceptance device as described herein may result in preventing unauthorized transactions involving fraud or theft by letting acquirers know the location of the POS terminals. Further, merchants with multiple POS terminals at their stores may be able to keep track of the activity and location of each POS terminal during transactions.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising a facilitator module, the facilitator module comprising:
   at least one processor; and
   at least one memory in communication with the at least one processor, the at least one memory including computer program code, which when executed by the at least one processor, causes the facilitator module to:
   receive, from a payment acceptance device relating to a merchant, transaction request data corresponding to a transaction request, wherein the transaction request data comprises:
      merchant data identifying the payment acceptance device; and
      location information identifying a location of the payment acceptance device at which the transaction request is initiated, wherein the location of the payment acceptance device at which the transaction request is initiated is determined using a communication network used by the payment acceptance device when a transaction associated with the transaction request is initiated, the communication network comprising a code division multiple access (CDMA) network or a global system for mobile communication (GSM) network;
   retrieve, from a database, a payment acceptance device identifier based on the merchant data received from the payment acceptance device;
   identify a registered location for the payment acceptance device based on the retrieved payment acceptance device identifier; and
   authenticate the payment acceptance device by comparing at least a portion of the location of the payment acceptance device at which the transaction request is initiated with at least a portion of the registered location of the payment acceptance device.

2. The system as claimed in claim 1, wherein the transaction associated with the transaction request is permitted if the location of the payment acceptance device at which the transaction request is initiated matches the registered location for the payment acceptance device.

3. The system as claimed in claim 1, wherein the computer program code, when executed by the at least one processor, further causes the facilitator module to:
   send a result of the comparison to a user device; and
   receive, from the user device, an approval to conduct the transaction associated with the transaction request in response to the result, wherein the transaction is conducted in response to receiving the approval.

4. The system as claimed in claim 1, wherein the payment acceptance device identifier comprises information to identify the communication network.

5. The system as claimed in claim 1, wherein the payment acceptance device comprises a point-of-sale terminal.

6. A computer-implemented method comprising:
   receiving, by at least one processor and from a payment acceptance device relating to a merchant, transaction request data corresponding to a transaction request, wherein the transaction request data comprises:
      merchant data identifying the payment acceptance device; and
      location information identifying a location of the payment acceptance device at which the transaction request is initiated, wherein the location of the payment acceptance device at which the transaction request is initiated is determined using a communication network used by the payment acceptance device when a transaction associated with the transaction request is initiated, the communication network comprising a code division multiple access (CDMA) network or a global system for mobile communication (GSM) network;
   retrieving, from a database, a payment acceptance device identifier based on the merchant data received from the payment acceptance device;
   identifying a registered location for the payment acceptance device based on the retrieved payment acceptance device identifier; and
   authenticating the payment acceptance device by comparing at least a portion of the location of the payment acceptance device at which the transaction request is initiated with at least a portion of the registered location of the payment acceptance device.

7. The method according to claim 6, wherein the transaction associated with the transaction request is permitted if the location of the payment acceptance device at which the transaction request is initiated matches the registered location for the payment acceptance device.

8. The method according to claim 6, wherein authenticating the payment acceptance device comprises:
   sending a result of the comparison to a user device; and
   receiving, from the user device, an approval to conduct the transaction associated with the transaction request in response to the result, wherein the transaction is conducted in response to receiving the approval.

9. The method according to claim 6, wherein the transaction request data further comprises information relating to the merchant, and wherein authenticating the payment acceptance device comprises:
   sending, to a user device, a result of the comparison and the information relating to the merchant, the merchant data, the location information, or combinations thereof; and
   receiving, from the user device, an approval to conduct the transaction associated with the transaction request in response to the result and the information relating to the merchant, the merchant data, the location information, or combinations thereof, wherein the transaction is conducted in response to receiving the approval.

10. The method according to claim 6, wherein authenticating the payment acceptance device comprises:
    sending, to a third party authentication server, a result of the comparison; and
    receiving, from the third party authentication server, an approval to conduct the transaction associated with the transaction request in response to the result, wherein the transaction is conducted in response to receiving the approval.

11. The method according to claim 6, further comprising determining the payment acceptance device identifier at a time of installing the payment acceptance device based on a category of the merchant, wherein the category comprises an industry-type of the merchant.

12. The method according to claim 6, wherein the payment acceptance device identifier comprises information to identify the communication network.

13. The method according to claim 11, further comprising:
storing the determined payment acceptance device identifier in the database; and
forwarding, to a server, the payment acceptance device identifier stored in the database.

14. The method according to claim 6, wherein the payment acceptance device comprises a point-of-sale terminal.

15. A non-transitory computer-readable storage medium having stored thereon computer program instructions which, when executed by at least one processor, cause the at least one processor to:
receive, from a payment acceptance device relating to a merchant, transaction request data corresponding to a transaction request, wherein the transaction request data comprises:
merchant data identifying the payment acceptance device; and
location information identifying a location of the payment acceptance device at which the transaction request is initiated, wherein the location of the payment acceptance device at which the transaction request is initiated is determined using a communication network used by the payment acceptance device when a transaction associated with the transaction request is initiated, the communication network comprising a code division multiple access (CDMA) network or a global system for mobile communication (GSM) network;
retrieve, from a database, a payment acceptance device identifier based on the merchant data received from the payment acceptance device;
identify a registered location for the payment acceptance device based on the retrieved payment acceptance device identifier; and
authenticate the payment acceptance device by comparing at least a portion of the location of the payment acceptance device at which the transaction request is initiated with at least a portion of the registered location of the payment acceptance device.

16. The system as claimed in claim 1, wherein the transaction request data further comprises information relating to the merchant, and wherein the computer program code, when executed by the at least one processor, further causes the facilitator module to:
send, to a user device, a result of the comparison and the information relating to the merchant, the merchant data, the location information, or combinations thereof; and
receive, from the user device, an approval to conduct the transaction associated with the transaction request in response to the result and the information relating to the merchant, the merchant data, the location information, or combinations thereof, wherein the transaction is conducted in response to receiving the approval.

17. The system as claimed in claim 1, wherein the computer program code, when executed by the at least one processor, further causes the facilitator module to:
send, to a third party server, a result of the comparison; and
receive, from the third party server, an approval to conduct the transaction associated with the transaction request in response to the result, wherein the transaction is conducted in response to receiving the approval.

18. The system as claimed in claim 1, wherein the computer program code, when executed by the at least one processor, further causes the facilitator module to:
determine the payment acceptance device identifier at a time of installing the payment acceptance device based on a category of the merchant, wherein the category comprises an industry-type of the merchant;
store the determined payment acceptance device identifier in the database; and
forward, to a server, the payment acceptance device identifier stored in the database.

19. The system as claimed in claim 1, wherein the transaction associated with the transaction request is initiated between a user device and the payment acceptance device using a first communication network, and wherein the computer program code, when executed by the at least one processor, further causes the facilitator module to:
send a result of the comparison to the user device using a second communication network, wherein the first communication network and the second communication network are different; and
receive, from the user device using the second communication network, an approval to conduct the transaction in response to the result, wherein the transaction is conducted in response to receiving the approval.

20. The system as claimed in claim 1, wherein the location of the payment acceptance device at which the transaction request is initiated is determined by the payment acceptance device using the communication network when the transaction associated with the transaction request is initiated.

* * * * *